(12) United States Patent
Carpenter

(10) Patent No.: US 11,718,416 B2
(45) Date of Patent: Aug. 8, 2023

(54) METHOD AND SYSTEM FOR AUTOMATIC SEQUENCING OF BAGGAGE

(71) Applicant: Siemens Logistics LLC, DFW Airport, TX (US)

(72) Inventor: Michael D. Carpenter, Arlington, TX (US)

(73) Assignee: Siemens Logistics LLC, DFW Airport, TX (US)

( * ) Notice: Subject to any disclaimer, the term of this patent is extended or adjusted under 35 U.S.C. 154(b) by 418 days.

(21) Appl. No.: 16/944,655

(22) Filed: Jul. 31, 2020

(65) Prior Publication Data

US 2021/0053699 A1 Feb. 25, 2021

Related U.S. Application Data

(60) Provisional application No. 62/889,593, filed on Aug. 21, 2019.

(51) Int. Cl.
*B64F 1/36* (2017.01)
*B64F 1/32* (2006.01)

(52) U.S. Cl.
CPC .............. *B64F 1/368* (2013.01); *B64F 1/324* (2020.01)

(58) Field of Classification Search
CPC ................................ B64F 1/368; B64F 1/324
See application file for complete search history.

(56) References Cited

U.S. PATENT DOCUMENTS

| 3,695,462 A  * | 10/1972 | Sullivan ................. | B64F 1/366 414/273 |
|---|---|---|---|
| 3,874,302 A  * | 4/1975 | Crosswhite ............ | B61B 10/04 104/170 |
| 2005/0056576 A1* | 3/2005 | Koini ..................... | G06Q 50/30 209/630 |
| 2011/0002761 A1* | 1/2011 | Aimable-Lima ....... | B64F 1/324 198/348 |
| 2012/0022684 A1* | 1/2012 | Hernot ................... | B64F 1/368 700/225 |
| 2015/0278726 A1* | 10/2015 | Marx ..................... | G16H 40/20 705/2 |
| 2017/0200248 A1* | 7/2017 | Murphy ................. | B62B 3/005 |
| 2018/0111698 A1* | 4/2018 | Podnar ................. | G06Q 10/043 |
| 2018/0192374 A1* | 7/2018 | Jain .................. | H04W 52/0254 |
| 2018/0290765 A1* | 10/2018 | Dinkelmann .......... | G01G 11/00 |
| 2021/0049767 A1* | 2/2021 | Paglieroni ............. | G06T 7/0004 |
| 2021/0053699 A1* | 2/2021 | Carpenter ............. | B64F 1/324 |
| 2021/0174465 A1* | 6/2021 | Carpenter ............. | G06Q 50/28 |

* cited by examiner

*Primary Examiner* — Donald J Wallace
*Assistant Examiner* — Jalal C Coduroglu

(57) ABSTRACT

A baggage processing system includes a storage array having a plurality of cells, each cell being configured to contain a single baggage item which is associated with a flight. The baggage processing system further includes a loading conveyor that receives baggage items retrieved from the storage array. A control system prepares a sequenced list of baggage items and controls the retrieval of baggage items from the storage array based on the sequenced list, whereby the retrieved baggage items are placed on the loading conveyor in an order conforming to the sequenced list. The baggage processing system also includes a queue of carts, where each cart is positionable to receive baggage items in sequence from a loading point on the loading conveyor, for transporting the baggage items to an aircraft. The sequenced list of baggage items defines a sequence of loading baggage items from the carts to the aircraft.

9 Claims, 4 Drawing Sheets

METHOD AND SYSTEM FOR AUTOMATIC SEQUENCING OF BAGGAGE

CROSS REFERENCE TO RELATED APPLICATIONS

This application claims priority to the U.S. provisional application No. 62/889,593 filed Aug. 21, 2019, which is incorporated by reference herein in its entirety.

TECHNICAL FIELD

The present disclosure is directed, in general, to baggage processing, and in particular, to sorting and sequencing of baggage.

BACKGROUND

Airport baggage services include handling systems that process passenger checked luggage from check in (or sometimes from transfer) to loading aboard passenger aircraft. The processing of baggage within baggage systems at medium to large airports tends to be highly automated up to the point at which bags are accumulated for a particular flight and loaded into either carts or unit load devices (ULDs).

SUMMARY

Briefly, aspects of the present disclosure provide an improved technique for sorting and sequencing of baggage items for loading into an aircraft.

According to a first aspect, a baggage processing system is provided. The baggage processing system comprises a storage array comprising a plurality of cells, each cell being configured to contain a single baggage item which is associated with a flight. The baggage processing system further comprises a loading conveyor configured to receive baggage items retrieved from the storage array. The baggage processing system further comprises a control system configured to prepare a sequenced list of baggage items and to control the retrieval of baggage items from the storage array based on the sequenced list, whereby the retrieved baggage items are placed on the loading conveyor in an order conforming to the sequenced list. The baggage processing system further comprises a queue of carts, each cart being positionable to receive baggage items in sequence from a loading point on the loading conveyor, for transporting the baggage items to an aircraft. The sequenced list of baggage items defines a sequence of loading baggage items from the carts to the aircraft.

According to a second aspect, a method for baggage processing is provided. The method comprises storing baggage items in a storage array, the storage array comprising a plurality of cells, each cell being configured to contain a single baggage item which is associated with a flight. The method further comprises preparing a computer-generated sequenced list of baggage items. The method further comprises retrieving baggage items from the storage array and placing the retrieved baggage items on a loading conveyor in an order conforming to the sequenced list. The method further comprises loading baggage items in sequence into respective carts in a queue of carts, from a loading point on the loading conveyor. The method further comprises transporting baggage items by the carts to an aircraft. As per the method, the sequenced list of baggage items defines a sequence of loading baggage items from the carts to the aircraft.

According to a third aspect, an article of manufacture is provided that comprises a non-transitory computer-readable storage medium including instructions which may be executed by a computerized control system of a baggage processing system. Upon execution of the instructions, the control system controls storage of baggage items in a storage array, the storage array comprising a plurality of cells, each cell being configured to contain a single baggage item which is associated with a flight. The control system prepares a sequenced list of baggage items. The control system further controls retrieval of baggage items from the storage array and placement of the retrieved baggage items on a loading conveyor in an order conforming to the sequenced list. The control system further controls loading of baggage items in sequence into respective carts in a queue of carts, from a loading point on the loading conveyor, for transportation to an aircraft. The sequenced list of baggage items defines a sequence of loading baggage items from the carts to the aircraft.

Additional technical features and benefits may be realized through the techniques of the present disclosure. Embodiments and aspects of the disclosure are described in detail herein and are considered a part of the claimed subject matter. For a better understanding, refer to the detailed description and to the drawings.

BRIEF DESCRIPTION OF THE DRAWINGS

The foregoing and other aspects of the present disclosure are best understood from the following detailed description when read in connection with the accompanying drawings.

DETAILED DESCRIPTION

Figure 1:
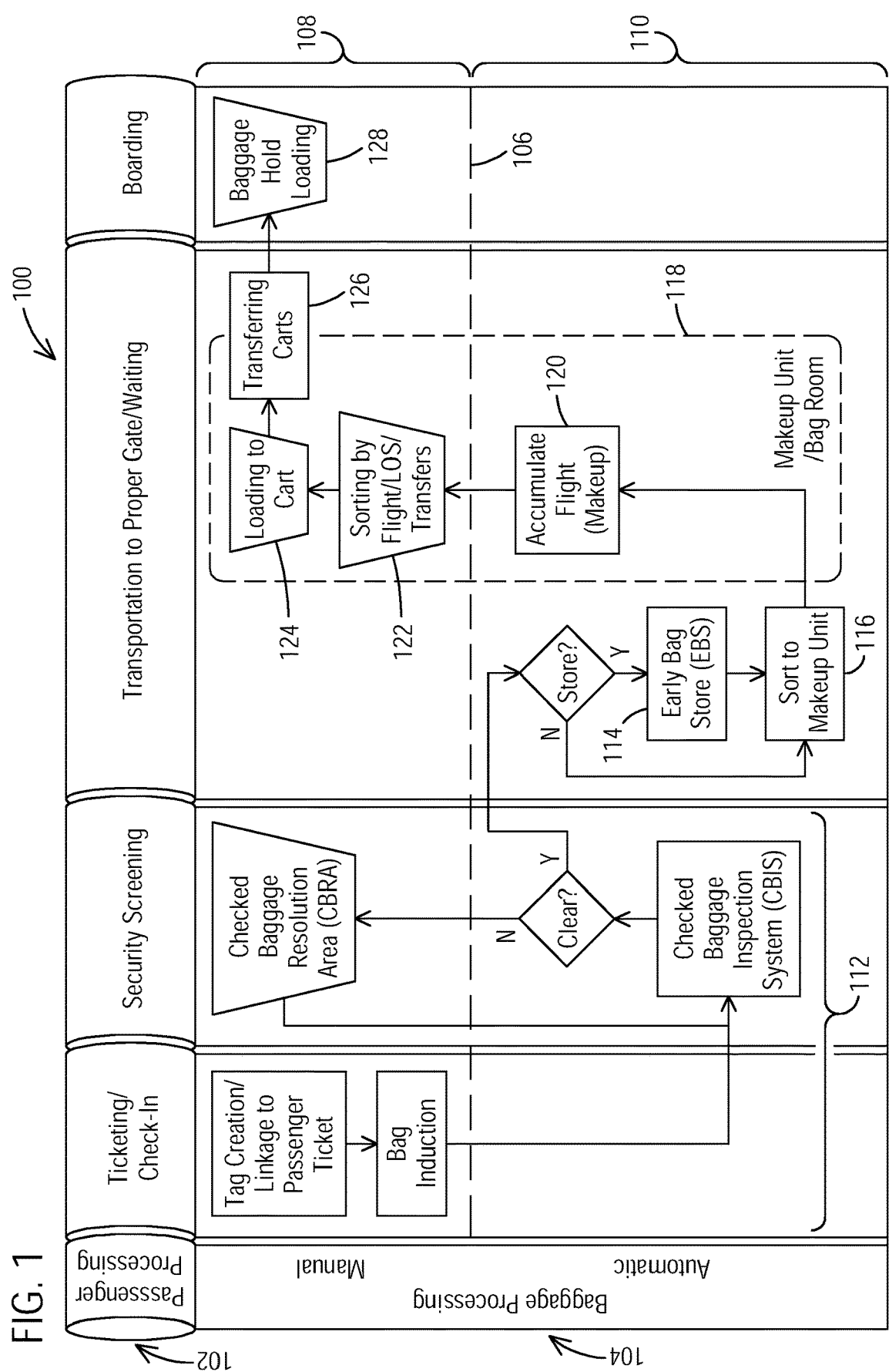
FIG. 1 is a flowchart illustrating a workflow in a baggage processing system in parallel with passenger boarding steps in an airport.

Various technologies that pertain to systems and methods will now be described with reference to the drawings, where like reference numerals represent like elements throughout. The drawings discussed below, and the various embodiments used to describe the principles of the present disclosure in this patent document are by way of illustration only and should not be construed in any way to limit the scope of the disclosure. Those skilled in the art will understand that the principles of the present disclosure may be implemented in any suitably arranged apparatus. It is to be understood that functionality that is described as being carried out by certain system elements may be performed by multiple elements. Similarly, for instance, an element may be configured to perform functionality that is described as being carried out by multiple elements. The numerous innovative teachings of the present application will be described with reference to exemplary non-limiting embodiments.

Baggage processing at an airport begins at baggage check-in and concludes after loading the checked-in baggage items aboard a passenger aircraft.

FIG. 1 illustrates a flowchart 100 where the familiar passenger process 102 is depicted at the top, and the baggage processing workflow 104 is depicted underneath. As shown, at least a portion of the baggage processing workflow 104 may be automated. In this example, the portion 108 of the workflow 104 that is above the line 106 is manually executed, while the portion 110 of the workflow 104 that is below the line 106 is substantially automated.

The initial set of steps 112 of the baggage processing workflow 104 includes checking-in of baggage items where a tag is created for each checked-in baggage item and linked to a passenger ticket, induction of the checked-in baggage items, screening of the checked-in baggage items and resolution of baggage items that were not cleared by the screening. If storage is required, the baggage items are moved to an early bag store (EBS) 114. Storage of baggage items may be required, for example, in case of overnight layovers. In many modern airports, especially in international hubs, the EBS 114 is completely automated and may be used for all checked-in baggage items. Automated EBS is essentially an automatic storage/retrieval system for baggage items that is typically situated between security screening (check in) and sorting.

In a first sorting step 116, baggage items retrieved from the EBS 114 (or in some cases, directly after screening) are sorted to an appropriate makeup unit (MU) 118, among a plurality of MUs in a bag room. The storage function 120 at the MU 118 is typically a combination of accumulating baggage items on a baggage carousel or runout and accumulation in carts (e.g., ULDs). A second sorting step 122 associates baggage items with flights and provides a sequence of loading according to their placement in a sequence of carts. In this second sorting step 122, baggage items are arranged to be loaded according to a first-in, last-out principle (FILO) so that the baggage items that are associated with premium service requirements or transfers are last in sequence of loading, making them first in sequence of unloading, and available earlier to premium passengers and for transfer to other flights.

At step 124, subsequent to the second sorting step 122, baggage items are loaded into carts. At step 126, the carts are transported to an aircraft. Finally, at step 128, baggage items are loaded into the aircraft from the carts.

While baggage processing includes large areas of automation, the area where automation has largely been resisted is in the bag room, which includes the MUs that collect mixed streams of baggage and sort them into baggage carts that are ready to be transported to aircraft for loading.

MU baggage sorting is based on a classical hierarchical structure of elements, including attributes related to the flight, issues of service privilege (1st class handling, etc.), and downstream transfers or connections. Each flight is assigned to a MU and a time slot within that MU. Typical time slots for the assigned MU may be 120 to 180 minutes or more prior to departure of the assigned flight. Typically, the MU is scheduled to close about 30 minutes prior to departure. This time can vary depending on the time it might take to deliver baggage items from the specific MU to the particular aircraft. The approximately 160-minute MU window far exceeds the time needed to sort and load the related baggage into carts. Productivity in the MU tends to be far less than rates that are achieved in similar industrial material handling applications, primarily due to the relatively long operational window, coupled with inefficiencies and poor ergonomics in the typical MU work environment.

FIG. 1 thus illustrates two storage functions, namely the EBS 114 and the MU 118. Efforts aimed at improving the productivity of the MU 118 have largely focused on capacity expansions of the centralized, automated EBS 114. An automated EBS 114 with adequate capacity and performance can shift a downstream baggage handling system from a push process to a pull process, with prescribed operating windows that can be tightened, thus improving utilization and efficiency. Improved utilization and efficiency in turn open the possibility for the use of loading technology to further improve productivity. Examples include articulating conveyors, or even robotics.

Expanding the centralized EBS 114 may lead to some challenges. For example, a massive centralized footprint is required to achieve adequate buffering. In addition, centralized EBS systems are typically designed around trays, often referred to as Individual Container System (ICS) components that are designed to provide a surface not only for transporting and storing, but also for sorting. This makes the containers significantly larger than the baggage items that they carry and increases the volume required to store each baggage item.

Most sorting processes, including MU sorting, remain downstream of the EBS 114 which leaves a significant gap in automation that would need to be bridged to provide compatibility with loading technology for optimal productivity gains.

As per aspects of the present disclosure, rather than expanding EBS 114, an automated storage and retrieval capability is implemented in the MU 118.

Figure 2:
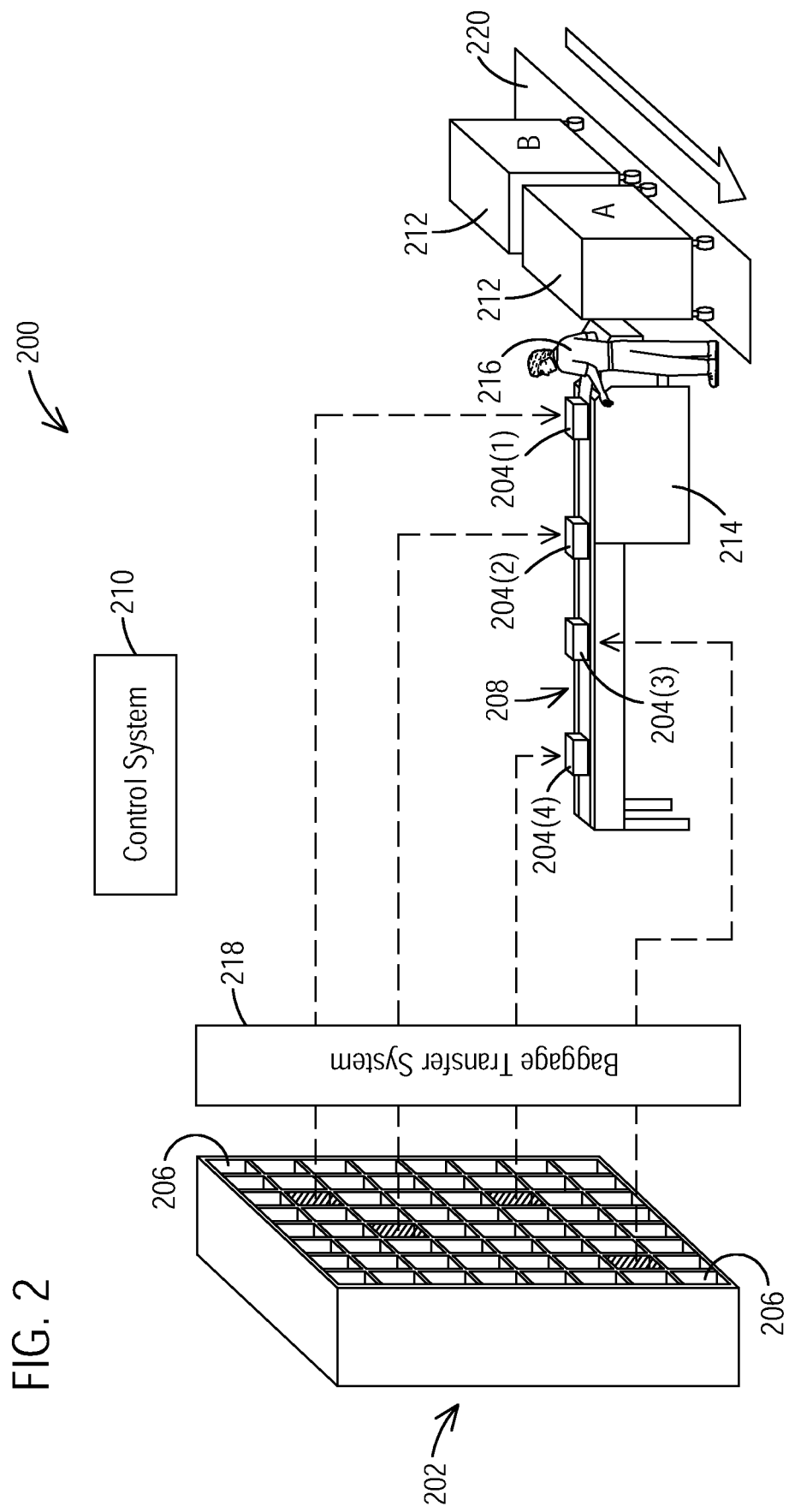
FIG. 2 is a schematic diagram illustrating a baggage processing system incorporating aspects of the present disclosure.

FIG. 2 illustrates a baggage processing system 200 according to an embodiment of the present disclosure. The illustrated baggage processing system 200 is provided with storage capability in the form of a storage array 202, which may be, for example, be associated with a makeup unit (MU) of an airport. The storage array 202 is made up of a plurality of cells 206 and is configured to allow baggage items 204 to be individually stored and retrieved from the storage array 202 by a baggage transfer system 218 in an optimal sequence and placed on a loading conveyor 208. The baggage processing system 200 further comprises a computerized control system 210 (see, for example, FIG. 4) which is configured to prepare a sequenced list of baggage items 204 and control the retrieval of baggage items 204 from the storage array 202 based on the sequenced list, whereby the retrieved baggage items 204 are placed on the loading conveyor 208 in an order conforming to the sequenced list. The baggage processing system 200 also includes a queue of carts 212. Each cart 212 is positionable to receive baggage items 204 in sequence from a loading point on the loading conveyor 208 (typically at the end of the loading conveyor 208), for transporting the baggage items 204 to an aircraft.

In this way, the same system may be utilized for storage, retrieval, sorting, and sequencing to ensure that the queue on the loading conveyor 208 represents a correct sequence of baggage items 204 that are ready to be loaded. The correct sequence is a loading sequence that produces an approximate unloading sequence after the flight, based on the first-in, last-out (FILO) constraints of the operation, in accordance with the requirements for transfers and stipulations of level of service (LOS), etc. In FIG. 2, the sequence of retrieval of the baggage items from the storage array 202 is illustrated by annotating the baggage items 204 on the loading conveyor 208 as (1), (2), (3), (4), etc., to identify their position in a loading sequence.

The loading conveyor 208 may comprise, for example, a horizontal belted device, a shuttle system, an automated guided vehicle (AGV) carrier, or any other device capable of moving the baggage items. The baggage transfer system 218 may comprise, for example, a gantry robot, a system of shuttles and elevators, AGVs, or other devices known in the field of automatic storage and retrieval systems (ASRS), which may be controllable by the control system 210 for placing baggage items in and retrieving baggage items out from the cells 206 of the storage array 202. A cart 212 may include, for example, a unit load device (ULD), or any other device capable of transporting baggage items received from the loading conveyor 208 to an aircraft for loading.

The computerized control system 210 may assign each baggage item 204 a cell 206 in the storage array 202, whereby each baggage item 204 is stored in its assigned cell 206. The cells 206 of the storage array 202 are addressable. Each cell 206 is configured to contain only a single checked-in baggage item 204, which is associated with a respective flight, to ensure that the address (location) of the storage cell 206 associated with each baggage item 204 is known by the control system 210. The storage array may typically store baggage items associated with multiple flights. The control system 210 may build a sequence of baggage items 204 for each flight based on the assigned criteria for that flight. For example, based on the FILO constraints, baggage items 204 that are due for making transfers may be typically positioned at the end of the sequence to assure that they are among the first to be removed at the next airport. Many passenger aircrafts are provided with more than one (typically two) cargo holds. In this case, the FILO constraints may be applied to the loading of each individual cargo hold.

As baggage items become known to the control system 210 after check-in (typically well in advance of their arrival at the MU), the control system 210 may begin to continually optimize the appropriate sequence of the baggage items 204, a process that may be allowed to continue for a single flight up until checked-in baggage items are no longer being accepted. Meanwhile, the sequence of baggage items checked-in, potentially altered in systems in which an EBS is used, determines the order of baggage items that arrive in the MU, and is unrelated to the actual sequence needed for loading.

Baggage items 204 may be introduced into the storage array 202 as they arrive in the MU. The baggage items 204 in storage may typically be assigned to one of multiple flights. The stored baggage items may be retrieved, based on their addresses stored by the control system 210, and loaded in sequence into carts 212. The sequenced list of baggage items generated by the control system 210 may be sorted by flight such that all baggage items associated with a particular flight are arranged in a continuous sequence on the loading conveyor 208, for being loaded contiguously to a group of carts 212 in the queue of carts.

The control system 210 may generate the sequenced list of baggage items for multiple flights according a combination of multiple factors, non-limiting examples for which include:

a) a schedule of loading conveyor availability: indicating which loading conveyor(s) among a plurality of loading conveyors are available at a given time;

b) information on planned flights: indicating the flights associated with the particular MU that are scheduled to depart in a given time window;

c) closing times for flights: which marks the cut-off time for aircraft cargo loading, for planned flights;

d) estimated cart capacity: indicating a capacity in terms of volume and/or number of baggage items, which may be estimated, for example, based on historical data;

e) estimated cart loading times: indicating a time taken to load an individual cart at the loading point in the MU, which may be estimated, for example, based on historical data;

f) estimated aircraft baggage hold loading times: indicating a time taken to complete a loading process to transfer baggage items from a cart to an aircraft cargo hold, which may be estimated, for example, based on historical data;

g) information on downstream flight connections; and h) information on layover times associated with downstream flight connections: ensuring that baggage items associated with shorter layover times with downstream flight connections are placed nearer to the aircraft cargo door.

The loading conveyor 208 transports the sequence of baggage items 204 retrieved from the storage array 202 to a loading point, which may be positioned near the queue of carts 212. As the baggage items 204 arrive in sequence at the loading point, an operator 216 may facilitate transfer of the baggage items 204 one-by-one to a respective cart 212 that is instantly positioned adjacent to the loading point. In the shown embodiment, the operator 216 is a human operator. In other embodiments, the above-mentioned task of the human operator 216 may be carried out by a robot. In one embodiment as shown in FIG. 2, the loading conveyor 208 may be provided with a loader 214 at the loading point. The loader 214 may be configured to bridge the gap between the loading conveyor 208 and the cart 212. Furthermore, the loader 214 may be controllable by the control system 210 to direct the baggage items 204 toward the cart 212, to eliminate manual lifting of the baggage items 204 by the operator 216.

In one embodiment, as shown in FIG. 2, the baggage processing system 200 may comprise a cart conveyor 220, for example including a belted device, on which the queue of carts 212 is arranged. The cart conveyor 220 may be controlled by the control system 210 to move the queue of carts 212 in dependence of the movement of a queue of baggage items 204 on the loading conveyor 208. Thus, as the stream of sequenced baggage items 204 is being transported to the loading point on the loading conveyor 208, the queue of carts 212 may be automatically advanced by the conveyor 220 under the control of the control system 210. In particular, the control system 210 may be configured to index the carts and synchronize the queue of carts 212 with the queue of baggage items 204, such that no decision may be necessary on the part of the operator 216 on where a baggage item needs to be loaded. The above-described approach may provide high productivity by ensuring no pauses in the flow of baggage items, whereby all work is focused on loading. When a cart conveyor is used, the provisioning of the carts into the system may involve a separate manual or automatic task (for example, using AGVs).

The baggage load for a particular flight often requires multiple carts 212. When a cart 212 being loaded becomes "full", i.e., reaches maximum capacity, a signal may be sent to the control system 210, based on which the control system 210 may index out the "full" cart (e.g., cart A in FIG. 2) and index in the next empty cart (e.g., cart B in FIG. 2) in the queue of carts 212. In one embodiment, the signal may be sent to the control system 210 from the loader 214, for example, based on a sensor reading of the instant capacity of the cart being loaded. In another embodiment, the signal may be sent to the control system 210 via the operator 216 actuating a switch in response to a cart reaching a maximum capacity. The capacity of a cart may be determined, for example, as a function of one or more of: cumulative weight of the baggage items being loaded, cumulative volume of the baggage items being loaded, count of the baggage items being loaded, among others. In response to the signal, the control system 210 may automatically advance the next empty cart in the queue into position at the loading point.

Since baggage items 204 associated with a single flight are brought to a single aircraft for loading, the entire baggage load for a particular flight may be allocated contiguously to a group of carts 212. Therefore, when a boundary between flights occurs in the sequence of baggage items 204 on the loading conveyor 208, the control system 210 may automatically index the cart loading queue to a fresh cart for the next flight in the queue. Thus, in response to the passage of a final baggage item for the particular flight, the control system 210 may automatically advance the next empty cart in the queue of carts into position at the loading point and (if present) send a signal to the loader 214.

The sequenced list of baggage items may be sorted by flight, and further sorted by priority levels within the particular flight, such that all baggage items associated with a particular priority level of a particular flight are arranged in a continuous sequence on the loading conveyor. The priority level may be dependent, for example, on one or more of: service class associated with baggage items, baggage items subject to transfer, and baggage items subject to tail-to-tail operations at the destination airport (moving baggage items from an arriving aircraft to a departing aircraft). The sequencing of baggage items may thus encompass a hierarchy of multiple flights and multiple priority levels, as illustrated in FIG. 3.

Figure 3:
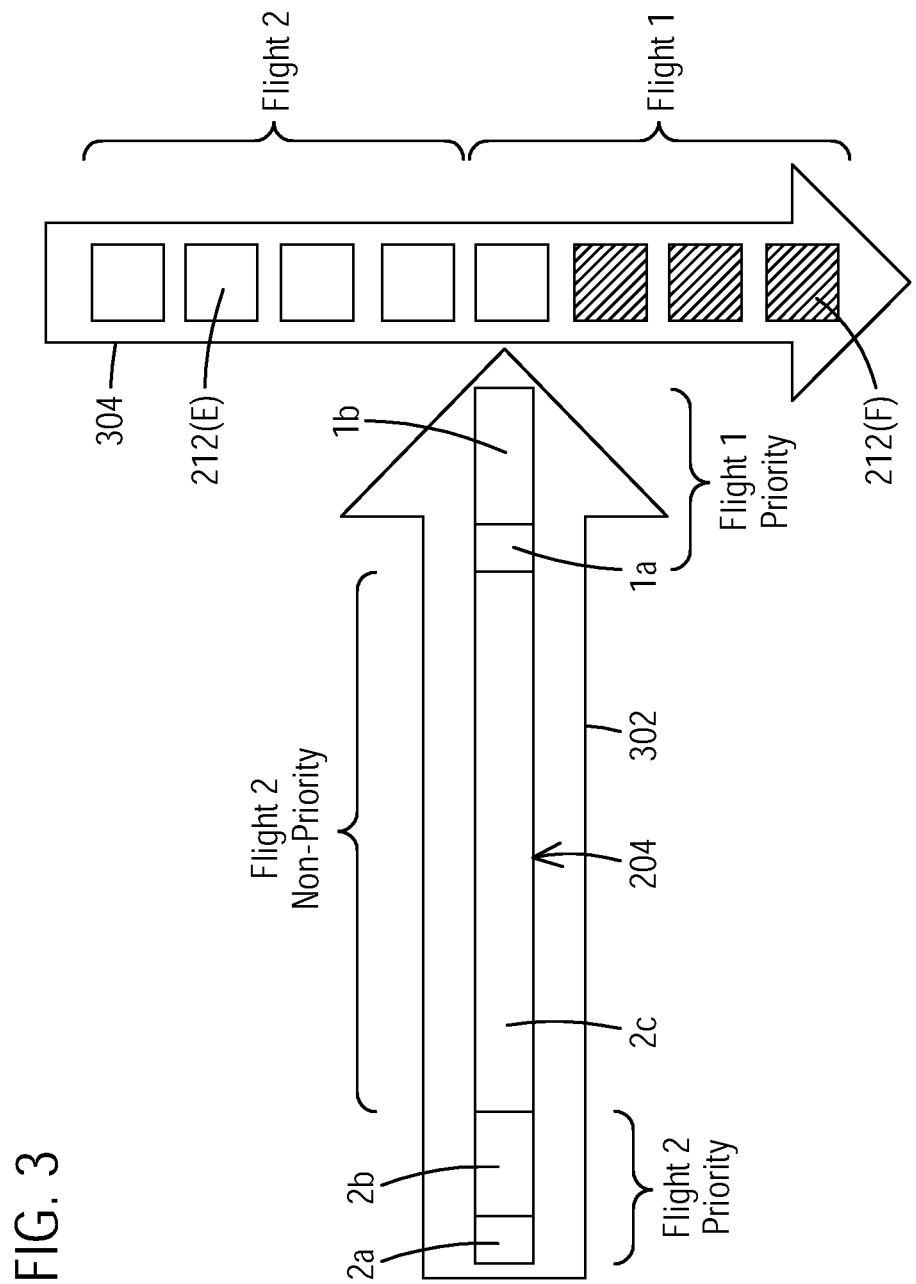
FIG. 3 is a schematic illustration of a sequenced arrangement of baggage.

Referring to FIG. 3, the arrow 302 indicates a sequenced queue of baggage items 204 on the loading conveyor and the arrow 304 indicates a sequenced queue of carts 212. Carts 212 that are "empty" are identified by un-hatched or white boxes and are annotated as (E), while carts 212 that are "full" are identified by hatched boxes and are annotated as (F). The filled carts 212(F) may be removed from the queue 304 for transporting the baggage items to an aircraft. The baggage items 204 in the shown sequence 302 belong to two flights, namely, Flight 1 and Flight 2. The baggage items of Flight 2 are sorted by priority levels, where: baggage items 2a are assigned the highest priority level and may include, for example, baggage items subject to a tail-to-tail operation; baggage items 2b are assigned an intermediate priority level and may include, for example, baggage items subject to downstream transfer and/or baggage items associated with a premium service class; and baggage items 2c are assigned no priority and represent regular baggage items. A similar set of priority levels are also applied to Flight 1 in this example, where: baggage items 1a are assigned the highest priority level (e.g., associated with a tail-to-tail operation); baggage items 1b are assigned an intermediate priority level (e.g., associated with premium service class, downstream transfer, etc.); and baggage items that are assigned no priority level are already loaded into the carts 212(F) and hence removed from the queue 302. The priority levels shown in FIG. 3 are merely for illustration. In some embodiments, the priority handling may include multiple priority levels assigned to a range of services classes.

As seen in FIG. 3, within the particular flight, baggage items that are assigned the highest priority levels are loaded the last into the carts 212, which also defines the loading sequence from the carts 212 to the aircraft cargo. For example, baggage items subject to tail-to-tail operations are loaded just before closure of the aircraft cargo door and may be typically placed close to the aircraft cargo door. This ensures that those items are among the first to be unloaded from the aircraft at the destination airport.

The sequenced list of baggage items generated by the control system is essentially a sequencing based on flights, and nested within that, a sequencing of classes or groups of baggage items based on priority levels. Within a given priority level of handling, the sequencing of individual baggage items may be relatively less relevant. However, in some embodiments, the control system may be configured to assign individual bags within a class or priority level to a defined position in the sequence. As an example, within a premium service class, the control system may assign a higher priority in the loading sequence to baggage items of a passenger with more reward points, miles etc.

Like an expanded EBS-based design, the described baggage processing system 200 converts the baggage handling process to a pull process, albeit with superior potential productivity improvement. This superiority is achieved by the capability of producing a predetermined sequence of baggage items at the loading point. Moreover, the described baggage processing system 200 obviates the need for an oversized EBS, and potentially, the need for an EBS altogether, thereby providing an improved use of space within the airport, particularly in the bag room. Furthermore, the described baggage processing system 200 allows that the space roughly equivalent to the bag room be reallocated from excessive carts clustered around conveyors and carousels to efficient, high capacity storage and handling. In addition, far fewer baggage carts and workers may be necessary.

Figure 4:
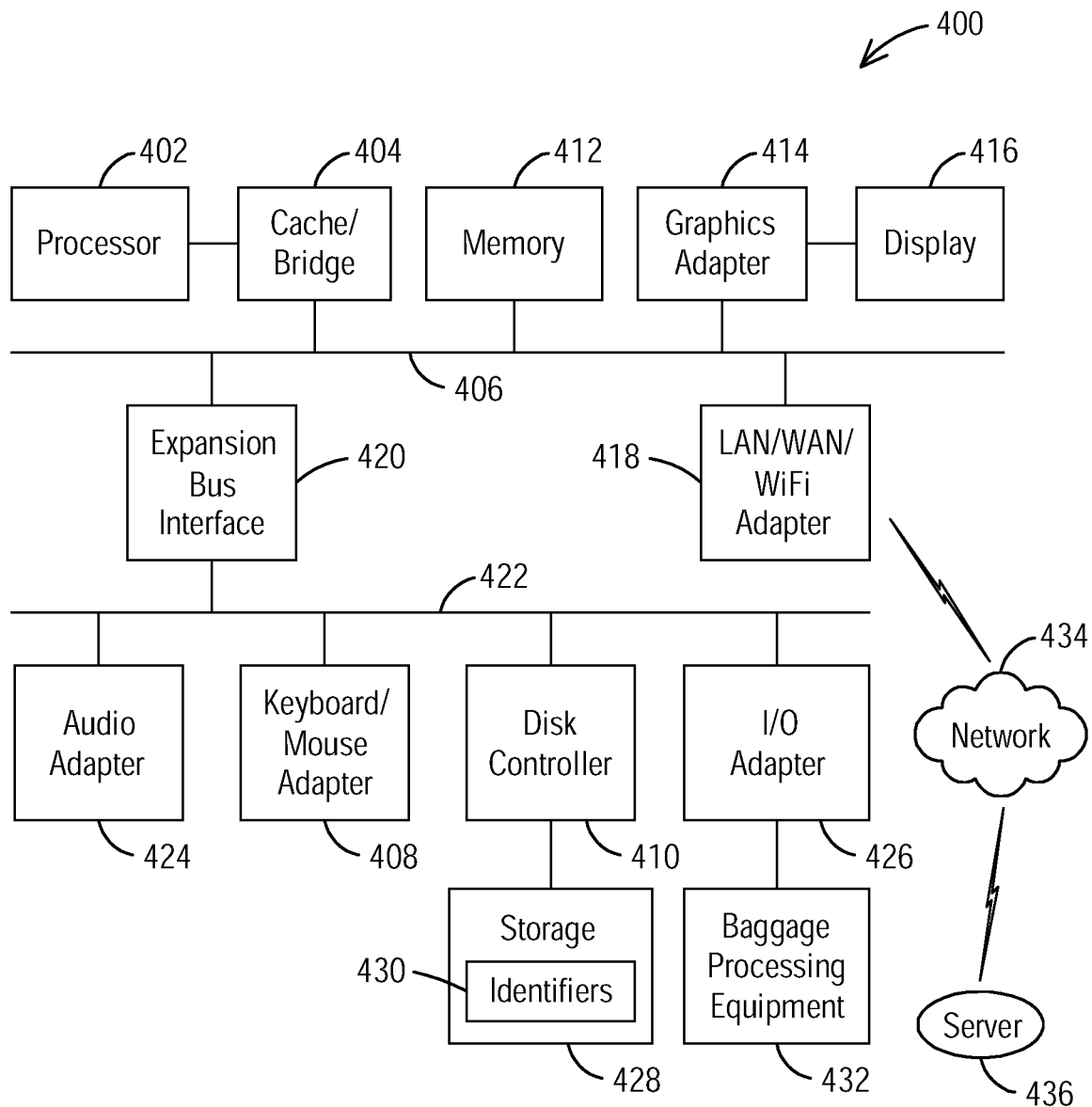
FIG. 4 illustrates a block diagram of a data processing system with which an embodiment can be implemented.

FIG. 4 illustrates a block diagram of a data processing system 400 with which an embodiment can be implemented, for example as control system 210 or other device configured by software or otherwise to perform the processes as described herein, and in particular as each one of a plurality of interconnected and communicating systems as described herein. The data processing system 400 depicted includes a processor 402 connected to a level two cache/bridge 404, which is connected in turn to a local system bus 406. Local system bus 406 may be, for example, a peripheral component interconnect (PCI) architecture bus. Also connected to local system bus 406 in the depicted example are a main memory 412 and a graphics adapter 414. The graphics adapter 414 may be connected to display 416.

Other peripherals, such as a LAN/WAN/Wireless adapter 418, may also be connected to local system I/O bus 422. Expansion bus interface 514 connects local system bus 406 to input/output (I/O) bus 418. I/O bus 422 is connected to keyboard/mouse adapter 408, disk controller 410, and I/O adapter 426. Disk controller 410 can be connected to a storage 428, which can be any suitable machine usable or machine readable storage medium, including but not limited to nonvolatile, hard-coded type mediums such as read only memories (ROMs) or erasable, electrically programmable read only memories (EEPROMs), magnetic tape storage, and user-recordable type mediums such as floppy disks, hard disk drives and compact disk read only memories (CD-ROMs) or digital versatile disks (DVDs), and other known optical, electrical, or magnetic storage devices. Storage 428 can store any data or executable instructions useful in performing processes as described herein, including in particular the identifiers 430 discussed above.

I/O adapter 426 is connected to control baggage processing equipment 432, which can be any of the baggage processing elements illustrated in FIG. 2.

Also connected to I/O bus 422 in the example shown is audio adapter 424, to which speakers (not shown) may be connected for playing sounds. Keyboard/mouse adapter 408 provides a connection for a pointing device (not shown), such as a mouse, trackball, trackpointer, touchscreen, etc.

Those of ordinary skill in the art will appreciate that the hardware depicted in FIG. 4 may vary for particular implementations. For example, other peripheral devices, such as an optical disk drive and the like, also may be used in addition or in place of the hardware depicted. The depicted example is provided for the purpose of explanation only and is not meant to imply architectural limitations with respect to the present disclosure.

A data processing system in accordance with an embodiment of the present disclosure includes an operating system employing a graphical user interface. The operating system permits multiple display windows to be presented in the graphical user interface simultaneously, with each display window providing an interface to a different application or to a different instance of the same application. A cursor in the graphical user interface may be manipulated by a user through the pointing device. The position of the cursor may be changed and/or an event, such as clicking a mouse button, generated to actuate a desired response.

One of various commercial operating systems, such as a version of Microsoft Windows™, a product of Microsoft Corporation located in Redmond, Wash. may be employed if suitably modified. The operating system is modified or created in accordance with the present disclosure as described.

LAN/WAN/Wireless adapter 418 can be connected to a network 434 (not a part of data processing system 400), which can be any public or private data processing system network or combination of networks, as known to those of skill in the art, including the Internet. Data processing system 400 can communicate over network 434 with server system 436, which is also not part of data processing system 400, but can be implemented, for example, as a separate data processing system 400.

Those skilled in the art will recognize that, for simplicity and clarity, the full structure and operation of all systems suitable for use with the present disclosure is not being depicted or described herein. Instead, only so much of the physical systems as is unique to the present disclosure or necessary for an understanding of the present disclosure is depicted and described. The remainder of the construction and operation of the systems disclosed herein may conform to any of the various current implementations and practices known in the art.

The embodiments of the present disclosure may be implemented with any combination of hardware and software. In addition, the embodiments of the present disclosure may be included in an article of manufacture (e.g., one or more computer program products) having, for example, a non-transitory computer-readable storage medium. The computer readable storage medium has embodied therein, for instance, computer readable program instructions for providing and facilitating the mechanisms of the embodiments of the present disclosure. The article of manufacture can be included as part of a computer system or sold separately.

The computer readable storage medium can include a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. Computer readable program instructions described herein can be downloaded to respective computing/processing devices from a computer readable storage medium or to an external computer or external storage device via a network, for example, the Internet, a local area network, a wide area network and/or a wireless network.

Although an exemplary embodiment of the present disclosure has been described in detail, those skilled in the art will understand that various changes, substitutions, variations, and improvements disclosed herein may be made without departing from the spirit and scope of the disclosure in its broadest form. In particular, the features and operations of various examples described herein and in the incorporated applications can be combined in any number of implementations.

The system and processes of the figures are not exclusive. Other systems and processes may be derived in accordance with the principles of the disclosure to accomplish the same objectives. Although this disclosure has been described with reference to particular embodiments, it is to be understood that the embodiments and variations shown and described herein are for illustration purposes only. Modifications to the current design may be implemented by those skilled in the art, without departing from the scope of the disclosure.

What is claimed is:

1. A baggage processing system comprising:
   a storage array comprising a plurality of cells, each cell being configured to contain a single baggage item which is associated with a flight,
   a loading conveyor configured to receive baggage items retrieved from the storage array and transport the baggage items to a loading point on the loading conveyor,
   a control system configured to prepare a sequenced list of baggage items and to control the retrieval of baggage items from the storage array based on the sequenced list, whereby the retrieved baggage items are placed on the loading conveyor in a sequence conforming to the sequenced list, such that the baggage items arrive in that sequence at the loading point on the loading conveyor, and
   a movable queue of carts, wherein each cart is temporarily positionable adjacent to the loading point on the loading conveyor to receive baggage items in sequence from the loading point on the loading conveyor, for transporting the baggage items to an aircraft,
   wherein the sequenced list of baggage items defines a sequence of loading baggage items from the carts to the aircraft.

2. The baggage processing system of claim 1, further comprising a cart conveyor on which the queue of carts is arranged, the cart conveyor being controllable by the control system to control a movement of the queue of carts in dependence of a movement of a queue of baggage items on the loading conveyor.

3. The baggage processing system of claim 2, wherein the cart conveyor is controllable by the control system to advance an empty cart, in the queue of carts, into position at the loading point, in response to a signal that a cart being loaded is "full".

4. The baggage processing system of claim 1, wherein the sequenced list of baggage items is sorted by flight such that all baggage items associated with a particular flight are arranged in a continuous sequence on the loading conveyor, for being loaded contiguously to a group of carts, in the queue of carts.

5. The baggage processing system of claim 4, wherein the control system is configured to control a movement of the queue of carts so as to advance an empty cart, in the queue of carts, into position at the loading point, in response to the passage of a final baggage item for the particular flight.

6. The baggage processing system of claim 4, wherein the sequenced list of baggage items is further sorted by priority level within the particular flight, such that all baggage items associated with a particular priority level of the particular flight are arranged in a continuous sequence on the loading conveyor.

7. The baggage processing system of claim 1, wherein the control system is configured to prepare the sequenced list of baggage items based on a combination of a plurality of factors selected from the group consisting of: schedule of loading conveyor availability, information on planned flights, closing times for flights, estimated cart capacity, estimated cart loading times, estimated cart transport times, estimated aircraft baggage hold loading times, information on downstream flight connections, and information on layover times associated with downstream flight connections.

8. The baggage processing system of claim 1, wherein the loading conveyor comprises a horizontal belted device, or a shuttle system, or an AGV carrier.

9. The baggage processing system of claim 1, further comprising a baggage transfer system controllable by the control system to retrieve baggage items from the storage array and position the retrieved baggage items on the loading conveyor in the order conforming to the sequenced list of baggage items.

* * * * *